W. LE R. SWEENEY.
TIRE.
APPLICATION FILED NOV. 7, 1911.
1,033,635.
Patented July 23, 1912.
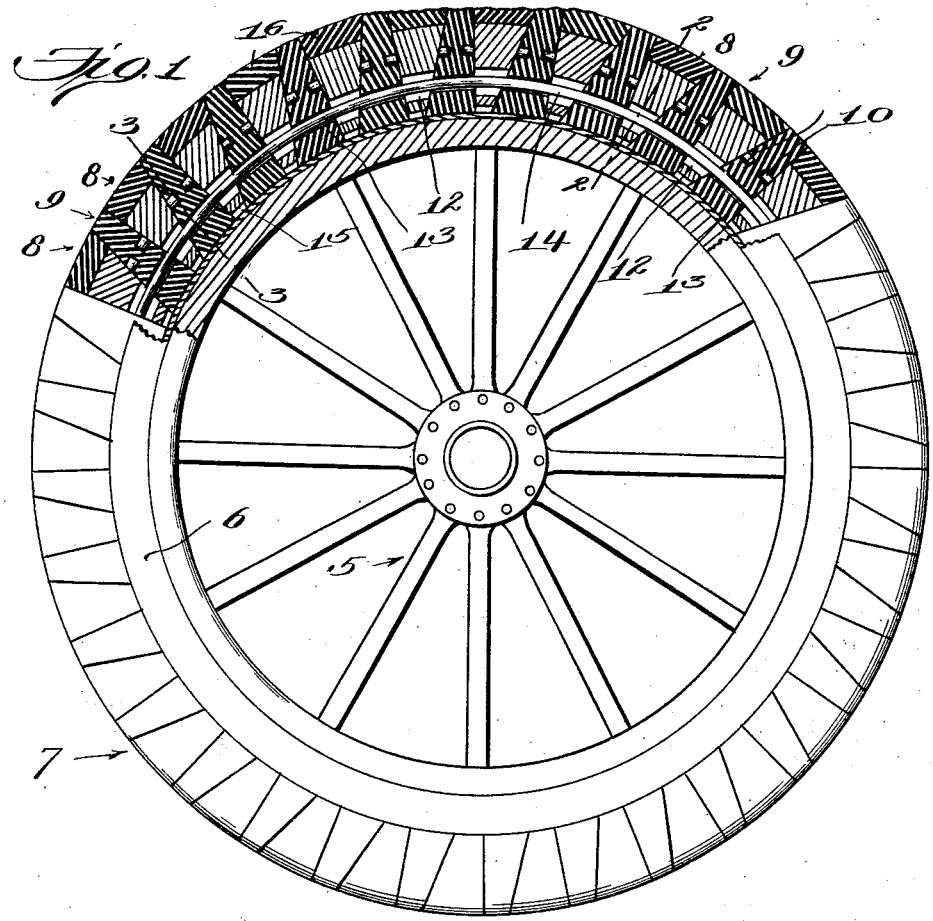
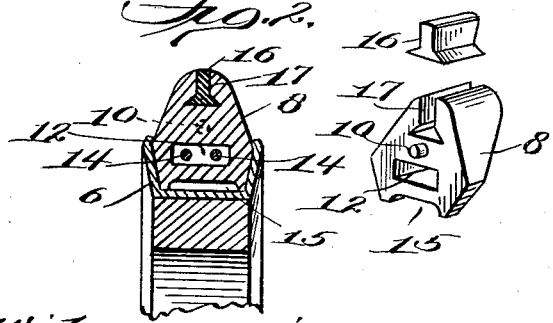
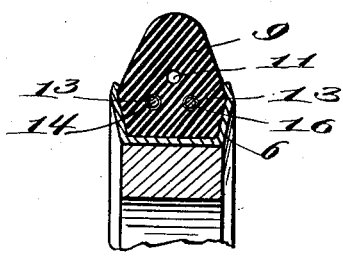
Inventor
William Le Roy Sweeney

UNITED STATES PATENT OFFICE.

WILLIAM LE ROY SWEENEY, OF SPARTANBURG, SOUTH CAROLINA, ASSIGNOR TO MARGARET S. M. SWEENEY, OF SPARTANBURG, SOUTH CAROLINA.

TIRE.

1,033,635.  Specification of Letters Patent.  Patented July 23, 1912.

Application filed November 7, 1911. Serial No. 659,011.

*To all whom it may concern:*

Be it known that I, WILLIAM LE ROY SWEENEY, a citizen of the United States, residing at Spartanburg, in the county of Spartanburg and State of South Carolina, have invented new and useful Improvements in Tires, of which the following is a specification.

This invention has reference to tires for vehicle wheels, and it comprehends certain improvements in tire construction whereby extreme durability and wearing power are provided for without impairing the requisite resiliency.

Briefly described, the improved tire comprises a series of alternating sections of steel and rubber which are so constructed and arranged as to insure the opposition of the former sections to the wear upon the tire, while the cushioning effect is obtained by the latter sections, the wear-resisting sections exerting no strain upon the connecting wires by reason of their particular conformation.

An embodiment of the invention is illustrated in the accompanying drawing, wherein:—

Figure 1 is a side elevation, with parts in section, of the tire applied to a wheel; Figs. 2 and 3 are transverse sections taken, respectively, through the steel and rubber sections, on the lines 2—2 and 3—3 of Fig. 1; and Fig. 4 is a perspective view of one of the steel sections, showing the tread shoe associated therewith.

In said drawing, 5 indicates, in a general manner, a wheel of any preferred conventional type, having the usual rim 6 of channel or trough-shaped cross-section, wherein the tire 7 is seated. The tire itself consists of a series of alternating sections 8 and 9, constituted, respectively, by steel and rubber blocks which are substantially wedge-shaped, as shown. These blocks are reversely arranged, with their inclined side faces in vertical contact, the enlarged portions of the metal blocks and the narrow portions of the rubber blocks being disposed outwardly and forming the tread of the tire. Each metal block is provided upon its opposite side faces with lateral pins 10 which are arranged in alinement with each other and are received in seats 11 formed in the side faces of the rubber blocks. Below said pins, the metal blocks are formed with enlarged openings 12 through which, and through correspondingly located openings 13 in the rubber blocks, the usual connecting wires 14 are passed, the openings 12 being sufficiently large to prevent said wires from coming into contact with the walls thereof when the tire is under compression, whereby the wires are free of all strain from the metal blocks and, in consequence, are incapable of being injured by said blocks. The narrow inner portions of the aforesaid metal blocks are cut away, as indicated by the numeral 15 in Figs. 1, 2, and 4, thus allowing for the expansion and contraction of the rubber blocks, and, also, reducing the frictional engagement of these blocks with the bottom of the rim.

To render the wheel comparatively noiseless in running, and to reduce the liability of skidding, the outer or tread portions of the metal blocks are provided with rubber inserts 16 which, in the construction illustrated, are in the form of dove-tailed shoes that fit in correspondingly-shaped seats 17 in said blocks. These shoes extend entirely across the blocks, from one side face to the other, and their ends, therefore, contact directly against the adjacent side faces of the rubber blocks on each side thereof, so that there will be produced, in effect, a continuous strip or band of rubber which completely encircles the outer periphery of the tire.

Having fully described my invention, I claim:

A tire comprising, in combination, a series of alternating reversely-tapered rubber and steel blocks connected together, the steel blocks having their enlarged portions disposed outwardly and formed with longitudinal seats extending from one side face thereof to the other, the narrow inner portions of said steel blocks being cut away centrally to provide for expansion and contraction of the adjacent rubber blocks, and rubber shoes fitted in said seats and having their opposite ends contacting directly with the adjacent side faces of the rubber blocks on each side thereof, to unite with the latter in producing a continuous tread of rubber which completely encircles the outer periphery of the tire.

In testimony whereof I have hereunto set my hand in presence of two subscribing witnesses.

WILLIAM LE ROY SWEENEY.

Witnesses:
J. E. WHISMANT,
B. C. CHAPMAN.

Copies of this patent may be obtained for five cents each, by addressing the "Commissioner of Patents, Washington, D. C."